Patented June 2, 1931

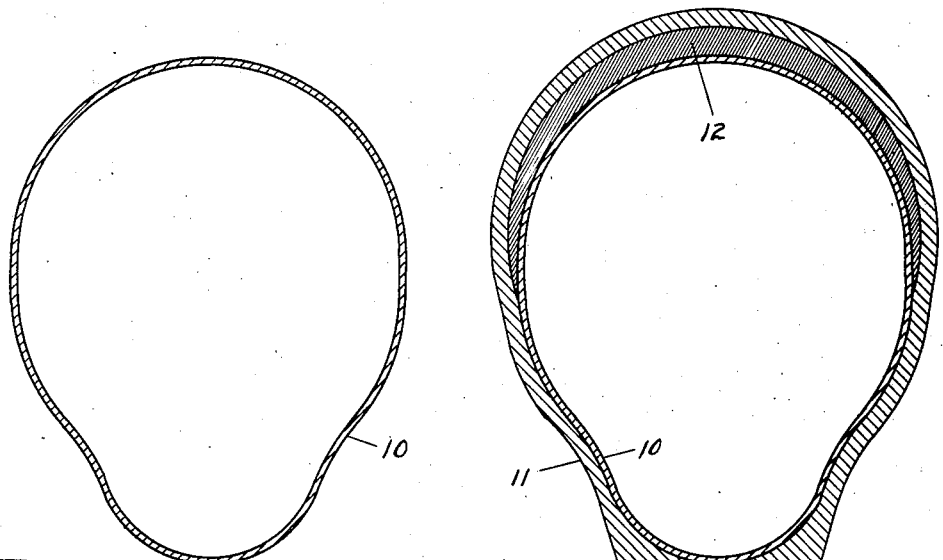
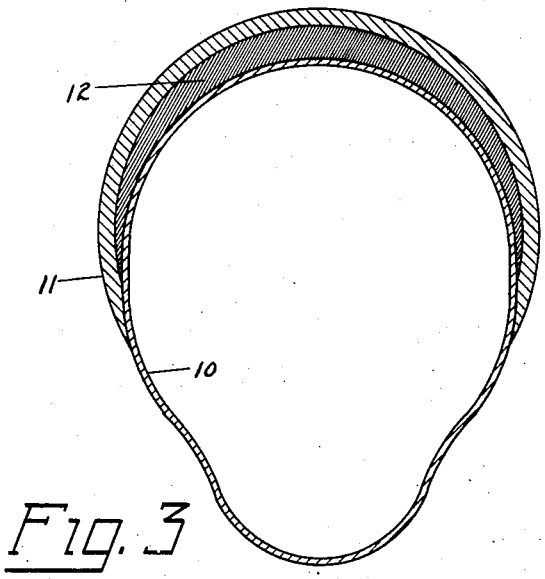

1,808,091

UNITED STATES PATENT OFFICE

JAMES W. WABER, OF CHICAGO, ILLINOIS

PNEUMATIC TIRE TUBE

Application filed August 9, 1930. Serial No. 474,147.

My invention relates to a self healing inner tube for use inside of the outer casings of automobiles and trucks, and also to the process of making the same.

The object of the invention is to provide a tube so designed and processed, that, when same is inflated if punctured, the pressure loss from the puncture is either entirely prevented or reduced to a minimum. It also is designed to diminish the ordinary deflation action prevalent in the tires and tubes now in common use.

A feature of my invention is the provision of a tube structure having an inner layer of elastic material which is formed of a predetermined size which inner layer then has applied to the outer circumference thereof a layer of mastic puncture healing material and an outer layer of elastic material, which structure is then cured in a mold of substantially the same size and shape as the inner contour of the casing which receives the tube.

Another feature of my invention is to provide a puncture proof tube, the outer surface of which is substantially the same shape or slightly larger than the inner surface of the casing with which it is to be used, thus eliminating any stretching of the tube when it is inflated.

Another feature of my invention is to provide a puncture proof tube by the two-cure process.

Another feature of my invention is to provide a tube formed of layers of rubber of different densities which reduces the porosity of the tube.

For a more complete understanding of my invention reference may be had to the accompanying drawing, ensuing specification and appended claims.

In the drawings:

Fig. 1 shows in cross-section the inner layer of elastic material molded to substantially the shape of the inner contour of the casing but to a smaller size, Fig. 2 depicts a cross-section of one form of my complete tube showing the layer of mastic material between the layers of elastic vulcanizable material, and Fig. 3 is a cross-section of an optional form of my complete tube, in which the outer layer of vulcanized material extends approximately half way around the tube.

Balloon tires are usually constructed with thin side walls and they have large contact area with the road which has made the same susceptible to puncture and stone bruises. Inner liners have been proposed but these have been objectionable as they have been constituted in part of fibre or fabric material which causes chafing and rupturing of the casing. Inner tubes having compression members, etc. have been proposed but these have been unsatisfactory.

The full molded tube of my invention of substantially the size and shape of the inner contour of the casing overcomes the objectionable features of prior tubes and provides a tube which is very satisfactory as to construction and durability.

It will be apparent from the accompanying drawings and the following description that while many of the elements of design and process are familiar to the art of making rubber products, old elements and new have been marshalled together to produce a new and novel puncture proof or puncture sealing inner tube entirely distinct from anything heretofore produced, easy to fit and install in a casing,—easy to repair in case of unusual injury,—more efficient than previous tires,— the usefulness of which will last for years with little or no deterioration.

The tube of the present invention is formed the same or nearly the same size and shape as it will assume when inflated in the casing and on the rim. In other words, so shaped and sized that it suffers little or no distortion when in use and inflated and so made that the part of the tube which, in use, underlies the tread portion of the casing is much thickened, allowing for an annular cavity throughout the thickened portion of the tube, which cavity is filled with a self sealing plastic compound that tightly adheres to a nail or other puncturing object when it is forced through the walls of the inner tube and the plastic material in the cavity so that the loss of pressure resulting from the puncture is entirely prevented in almost every case and in the few exceptions pressure loss is so reduced that it is negligible.

All of this tube with the exception of the plastic material in the cavity described, may be of ordinary tube stock. The better grades of tube stock now in common use in the rubber industry will prove best in this tube and the poorer grades of stock result in poorer tubes of this design and process.

The plastic material has two important characteristics;—first it must be adhesive, to adhere to the puncturing instrument when the puncturing instrument is allowed to remain in the walls of the tube, and also to adhere to objects when withdrawn but not so adhesive as not to be stripped from the puncturing instrument when it is withdrawn. In fact the plastic material is of just that degree of adhesiveness that when the nail or puncturing object is withdrawn, the outer covering of the plastic material strips the plastic material from off the object withdrawn forming a plug for the hole made in the outer covering of the plastic material, thus preventing the loss of pressure in the tube, in either case.

Another interesting and valuable contribution to the art of making puncture proof inner tubes was discovered and made use of in the manufacture of the present tube that cannot be readily shown in drawing but only described, and that is, when a tube made in the manner hereinafter set forth, has an outer periphery slightly greater than the inner periphery of the casing in which it is to be used, peripheral compression is produced which aids the process of sealing with resultant prevention and reduction of deflation for which purpose this tube has been invented.

To make an inner tube for the purposes and of the characteristics above described the following process has been followed:

Rubber stock was milled and compounded similar to that in general use in the rubber industry today. From this stock an inner tube is formed, the valve inserted, and the whole formed into an endless rubber ring capable of some distention by having compressed air forced through the valve. The tube in this condition resembles the ordinary inner tube in general use partially inflated except that the tube need not be vulcanized.

From this point the process sharply differentiates from all other processes used in building inner tubes, or puncture proof, or puncture sealing inner tubes.

The stock from which this tube has been formed is of such predetermined thickness and stiffness that it may be inflated to a predetermined size and placed on a form or building drum for completion and retain its dimensions or very nearly so.

On the tread portion of the tube, which has been inflated and placed on its form (a revolving form being best for the purpose) is placed a strip of plastic material with the characteristics above described. Because of the adhesive characteristics of this mastic material it adheres tenaciously to the inner tube becoming a component part thereof.

The next step in the process of building this tube is to take a piece of milled and compounded tube stock of a predetermined thickness (and compounded so that in the curing it will be timed to finish curing with the rest of the tube) and place it over the plastic material and extending farther down on the side walls of the tube than does the plastic material or even entirely around the original inner tube, thus entirely encompassing the plastic material. All of the material, except that which is to remain plastic and is kept as nearly as possible from sulphur, has been compounded in accordance with the ordinary practice in the industry so that when the proper degree of heat is applied it will vulcanize and become the vulcanized rubber familiar to all.

It has been found to be desirable that the two stocks making the original inner tube and the cover stocks have different densities so that when curing under heat and pressure the one stock is forced into the pores of the other and porosity therefore reduced to a minimum.

It has also been found that the two stocks have their time of cure balanced, the inside to cure faster and the outer to cure slower so that when the cure is finally completed both layers will be properly vulcanized.

I have found by placing a strip of vulcanizable tube stock around the inner periphery, thus thickening up that portion of the tube usually protected by a flap in common use, that a greatly improved tube is produced and the usual flap may be dispensed with.

After the tube is built up as above described it is placed in a mold of the predetermined size and shape and heat applied and the inflation or internal pressure increased to an amount sufficient to insure a neat exterior when removed from the mold after it is fully cured. When the proper time has elapsed for vulcanizing, the heat is withdrawn and the finished tube removed from the mold which completes this process.

However, this process may be varied as follows:

In this modified process the previously described process is followed up to the forming of the tube ready for the mastic or plastic material. In this modified process the inner or basic tube is cured or partially cured before the plastic material is applied thereto. In the modified process the basic tube is put in a curing mold of a predetermined size and shape and partially or fully cured, after which it is removed from the mold, inflated to the correct size and placed on the form and then the procedure followed in the first described process is carried out, this process varying from the first inasmuch as it is a two cure process while the former is a single cure process.

Referring more particularly to the drawings, I have shown a tube having a portion 10 which may be formed of ordinary vulcanizable tube stock, a portion 12 composed of a soft, sticky mastic material free of any curing agent, and a portion 11 of vulcanizable rubber similar to the portion 10 but which may be slightly thicker and also of a somewhat different density. In building the present tube the basic tube portion 10 is first formed as an annular, endless tube of a size slightly smaller than the inner cavity of the casing with which it is to be used. The ordinary valve stem (not shown) is next inserted in the tube 10, and the basic tube 10 is inflated to the point where it is fully expanded but under substantially no tension. In other words, it is inflated to about the size it will have when it is placed in use.

The expanded tube 10 is mounted on a building drum and the generally crescent-shaped strip of mastic material 12 is placed about the tread portion or outer periphery thereof. The mastic material 12 is now covered by an outer layer 11 of vulcanizable rubber which extends beyond the edges of the mastic material 12 and is arranged to be vulcanized to the basic tube 10, thus forming a closed pocket within which the mastic material is held. If desired, the outer layer 11 of vulcanizable rubber may be extended entirely around the basic tube portion 10 so far as to form a thickened base portion 13 as disclosed in Fig. 2 of the drawings.

The completed tube structure is now placed in a mold of substantially the size and shape of the cavity within the casing and vulcanized as previously explained.

In manufacturing puncture healing tubes I have heretofore attempted to build them on a mandrel or core and then splice the ends which has produced very unsatisfactory results due to the difficulty of making the splice. I have also attempted to place the mastic 12 and cover layer 11 on the basic tube 10 when in a collapsed condition, with the result that the mastic material and the outer elastic vulcanizable covering have been unevenly or irregularly placed on the outer or tread side of the basic tube. This was due in part to the difficulty of properly placing the mastic and cover layer on the basic tube when in its collapsed condition and was further due to the lack of uniformity of stretching of different parts of the tube when the tube was inflated.

In the present method of manufacture these difficulties are entirely overcome and the puncture healing material and outer elastic covering are regularly and uniformly placed about the tube. Also due to the fact that the entire tube structure may be built up before the tube is vulcanized, a tube which is without splices, seams or appreciable overlaps is formed. This type of tube has very marked advantages which are well known to those who are familiar with the tube-making art. It is believed that it is impossible to practically or commercially manufacture a seamless, endless, annular fully molded tube such as herein described without employing the air core which is an important feature of the present invention.

While the drawings and the above description disclose a particular form of my invention it is to be understood that modifications in certain particulars are contemplated and the invention, therefore, should be limited only by the scope of the appended claims.

Having thus described my invention, what I claim as new and desire to secure by Letters Patent of the United States is:

1. The method of constructing an inner tube for pneumatic tires which consists in forming an endless tube of vulcanizable rubber, expanding said tube by internal pressure, attaching to the outer circumference of said tube while inflated, a layer of plastic sealing compound, covering the compound with a vulcanizable rubber sheet which extends beyond the edges of the compound and contacts with the endless tube for adhesion thereto and curing the entire tube structure to produce a full molded tube.

2. The method of making an inner tube for pneumatic tires which consists in forming an endless tube of vulcanizable rubber whose dimensions are slightly smaller than the cavity in the tire casing in which said tube is intended to be used, expanding said tube by internal pressure, applying to the outer circumference of said tube while inflated a layer of plastic sealing compound, covering the said compound with a layer of vulcanizable rubber which extends beyond the edges of the compound and contacts with the endless tube for adhesion thereto and curing the entire tube structure in a mold whose cavity is substantially equal to the size and shape of the cavity of the tire casing in which said tube is intended to be used.

3. An inner tube for pneumatic tires comprising a basic inner layer, annular and tubular, of vulcanizable rubber, an outer cover layer of vulcanizable rubber, and a layer of plastic sealing compound interposed between said basic layer and said cover layer, the layers of said tube being full molded throughout the area covered by the sealing compound in substantially the form and shape assumed under normal inflation and therefore substantially free from strain or distortion under normal inflation, the said basic layer and cover layer being homogeneous throughout their contacting portions when vulcanized.

4. An inner tube for pneumatic tires comprising a basic inner layer, annular and tubular of vulcanizable rubber, an outer cover layer of vulcanizable rubber and a layer of plastic sealing compound interposed between the basic layer and said cover layer at a point overlying the tread portion of the basic layer, the layers of said tube being full molded in substantially the form and shape assumed under normal inflation and therefore substantially free from strain or distortion under normal inflation, the said basic layer and cover layer being homogeneous throughout their contacting portions when vulcanized.

5. An inner tube for pneumatic tires comprising a basic inner layer, annular and tubular, of vulcanizable rubber, an outer annular and tubular cover layer of vulcanizable rubber, and a layer of plastic sealing compound interposed between said basic layer and said cover layer, the layers of said tube being full molded in substantially the form and shape assumed under normal inflation and therefore substantially free from strain or distortion under normal inflation, the said basic layer and cover layer being homogeneous throughout their contacting portions when vulcanized.

6. An inner tube for pneumatic tires comprising a basic inner layer, annular and tubular, of vulanizable rubber, an outer cover layer of vulcanizable rubber, and a layer of plastic sealing compound interposed between said basic layer and said cover layer, said tube being full molded in substantially the form and shape assumed under normal inflation and when inflated to substantially fit the mold cavity will be approximately free of strain or distortion and will substantially fit the cavity of the tire case in which it is intended to be used, and said outer layer overlying the plastic sealing compound and contacting and forming with the basic layer a homogeneous unit when vulcanized.

7. The method of constructing an inner tube for pneumatic tires which consists in expanding an endless rubber tube by internal pressure, superimposing upon the tread portion of said tube while so expanded a layer of plastic sealing compound, then covering said compound with a vulcanizable rubber sheet, and curing the entire tube structure while expanded in a mold, to produce a full molded tube and cause the vulcanizable covering sheet to become an integral part of the endless tube.

Signed at Chicago, Illinois, this 4th day of August, 1930.

JAMES W. WABER.